(12) United States Patent
Welker (10) Patent No.: US 12,355,745 B1
(45) Date of Patent: Jul. 8, 2025

(54) SECURE MOBILE DEVICE MANAGEMENT (71) Applicant: Invisalert Solutions, Inc., West Chester, PA (US)

(72) Inventor: Brandt Welker, Reading, PA (US)

(73) Assignee: Invisalert Solutions, Inc., West Chester, PA (US)

( * ) Notice: Subject to any disclaimer, the term of this patent is extended or adjusted under 35 U.S.C. 154(b) by 0 days.

(21) Appl. No.: 18/976,319

(22) Filed: Dec. 10, 2024

Related U.S. Application Data (60) Provisional application No. 63/713,045, filed on Oct. 28, 2024.

(51) Int. Cl.
*H04L 9/40* (2022.01)

(52) U.S. Cl.
CPC .................. *H04L 63/08* (2013.01)

(58) Field of Classification Search
CPC ...................................... H04L 63/08
See application file for complete search history.

(56) References Cited

U.S. PATENT DOCUMENTS

| | | |
|---|---|---|
| 5,218,344 A | 6/1993 | Ricketts |
| 5,769,290 A | 6/1998 | Pestana |
| 6,225,906 B1 | 5/2001 | Shore |
| 6,406,426 B1 | 6/2002 | Reuss et al. |
| D507,798 S | 7/2005 | Jewitt et al. |
| 6,954,148 B2 | 10/2005 | Pulkkinen et al. |
| 7,154,397 B2 | 12/2006 | Zerhusen et al. |
| 7,242,306 B2 | 7/2007 | Wildman et al. |
| 7,382,247 B2 | 6/2008 | Welch et al. |
| D577,364 S | 9/2008 | Flynt et al. |
| 7,450,015 B2 | 11/2008 | Singer et al. |
| D588,152 S | 3/2009 | Okada |
| D588,153 S | 3/2009 | Okada |
| 7,541,935 B2 | 6/2009 | Dring et al. |

(Continued)

FOREIGN PATENT DOCUMENTS

| | | |
|---|---|---|
| GB | 2426180 A | 11/2006 |
| GB | 2549099 A | 10/2017 |

(Continued)

OTHER PUBLICATIONS

Consumer Cellular; Huawei 8652—managing contacts; 1 page (Screenshot); retrieved from the internet (https://www.youtube.com/watch?v=oCazslu6NLg on Sep. 17, 2012.

(Continued)

*Primary Examiner* — Benjamin A Kaplan
(74) *Attorney, Agent, or Firm* — Shay Glenn LLP (57) ABSTRACT

Apparatuses and methods for securely managing a mobile computing device can include determining parameters of a secure computing session and saving the parameters into one or more profile files accessible by a processing device. A user can establish a secure computing session by selecting a mobile computing device and providing a user ID and password. After the user ID and password is authenticated, a secure computing session is established with the mobile computing device in accordance with the one or more profile files. Sensitive session data may then be transmitted to the mobile computing device. At the end of the secure computing session, the sensitive session data is deleted from the mobile computing device.

28 Claims, 6 Drawing Sheets

(56) References Cited

U.S. PATENT DOCUMENTS

| | | |
|---|---|---|
| 7,570,152 B2 | 8/2009 | Smith et al. |
| D599,363 S | 9/2009 | Mays |
| D607,001 S | 12/2009 | Ording |
| 7,642,290 B2 | 1/2010 | Kaplan |
| D614,641 S | 4/2010 | Viegers et al. |
| 7,764,167 B2 | 7/2010 | Reeves et al. |
| 7,825,794 B2 | 11/2010 | Janetis et al. |
| D643,436 S | 8/2011 | Lemay |
| D656,157 S | 3/2012 | Khan et al. |
| D656,503 S | 3/2012 | Brierley et al. |
| D682,262 S | 5/2013 | Akana et al. |
| 8,605,094 B1 | 12/2013 | Alfaro et al. |
| D701,229 S | 3/2014 | Lee |
| D701,521 S | 3/2014 | Kim et al. |
| D715,820 S | 10/2014 | Rebstöck |
| D718,779 S | 12/2014 | Hang Sik et al. |
| D720,766 S | 1/2015 | Mandal et al. |
| D724,603 S | 3/2015 | Williams et al. |
| 8,984,436 B1 | 3/2015 | Tseng et al. |
| 9,064,391 B2 | 6/2015 | Vardi et al. |
| D765,110 S | 8/2016 | Liang |
| D789,956 S | 6/2017 | Ortega et al. |
| D797,133 S | 9/2017 | Marcolongo et al. |
| 9,928,713 B2 | 3/2018 | Baczuk et al. |
| D820,850 S | 6/2018 | Tekamp et al. |
| 10,410,498 B2 | 9/2019 | Coke et al. |
| D861,719 S | 10/2019 | Van Der Molen |
| D866,586 S | 11/2019 | Suter et al. |
| 10,482,753 B2 | 11/2019 | Nelson et al. |
| D873,278 S | 1/2020 | Nakahara et al. |
| D875,767 S | 2/2020 | Farnan et al. |
| D892,151 S | 8/2020 | Pontious |
| D906,359 S | 12/2020 | Nagy et al. |
| 10,896,590 B2 | 1/2021 | Nagy et al. |
| 11,210,918 B2 | 12/2021 | Nagy et al. |
| 11,682,283 B2 | 6/2023 | Nagy et al. |
| 12,094,318 B2 | 9/2024 | Nagy et al. |
| 2002/0060630 A1 | 5/2002 | Power |
| 2002/0196147 A1 | 12/2002 | Lau |
| 2004/0010720 A1* | 1/2004 | Singh ............ H04H 60/95 709/224 |
| 2005/0094205 A1 | 5/2005 | Lo et al. |
| 2007/0118813 A1 | 5/2007 | Forstall et al. |
| 2007/0129983 A1 | 6/2007 | Scherpbier et al. |
| 2007/0143611 A1 | 6/2007 | Arroyo et al. |
| 2007/0267475 A1 | 11/2007 | Hoglund et al. |
| 2008/0012767 A1 | 1/2008 | Caliri et al. |
| 2008/0015903 A1 | 1/2008 | Rodgers |
| 2008/0027288 A1 | 1/2008 | Renz |
| 2009/0019890 A1 | 1/2009 | Kirknoff |
| 2009/0075694 A1 | 3/2009 | Kim et al. |
| 2009/0299827 A1 | 12/2009 | Puri et al. |
| 2010/0026510 A1 | 2/2010 | Kiani et al. |
| 2010/0066541 A1 | 3/2010 | Craine |
| 2010/0090971 A1 | 4/2010 | Choi et al. |
| 2010/0201821 A1 | 8/2010 | Niem et al. |
| 2010/0217618 A1 | 8/2010 | Piccirillo et al. |
| 2010/0249540 A1 | 9/2010 | Lisogurski |
| 2010/0253521 A1 | 10/2010 | Williams, Sr. et al. |
| 2011/0082808 A1 | 4/2011 | Beykpour et al. |
| 2011/0105854 A1 | 5/2011 | Kiani et al. |
| 2011/0109461 A1 | 5/2011 | Aninye |
| 2011/0179387 A1 | 7/2011 | Shaffer et al. |
| 2011/0191124 A1 | 8/2011 | Sung et al. |
| 2011/0197163 A1 | 8/2011 | Jegal et al. |
| 2012/0016691 A1 | 1/2012 | Sievenpiper et al. |
| 2012/0095822 A1 | 4/2012 | Chiocchi |
| 2012/0154582 A1 | 6/2012 | Johnson et al. |
| 2012/0184207 A1 | 7/2012 | Gaines et al. |
| 2013/0018673 A1 | 1/2013 | Rubin |
| 2013/0110565 A1* | 5/2013 | Means, Jr. ............ G06Q 10/06 705/7.11 |
| 2013/0132908 A1 | 5/2013 | Lee et al. |
| 2013/0145663 A1 | 6/2013 | Greer |
| 2013/0218583 A1 | 8/2013 | Marcolongo et al. |
| 2013/0227486 A1 | 8/2013 | Brinda |
| 2014/0067770 A1 | 3/2014 | Cheong et al. |
| 2014/0184408 A1 | 7/2014 | Herbst et al. |
| 2014/0189608 A1 | 7/2014 | Shuttleworth et al. |
| 2014/0283142 A1 | 9/2014 | Shepherd et al. |
| 2015/0084769 A1 | 3/2015 | Messier et al. |
| 2015/0170504 A1 | 6/2015 | Jooste |
| 2015/0242665 A1 | 8/2015 | Antonescu et al. |
| 2015/0264647 A1 | 9/2015 | Lacatus et al. |
| 2016/0026837 A1 | 1/2016 | Good et al. |
| 2016/0078752 A1 | 3/2016 | Vardi |
| 2016/0109853 A1 | 4/2016 | Kobayashi |
| 2016/0253470 A1 | 9/2016 | Marcolongo et al. |
| 2017/0032093 A1 | 2/2017 | Norton et al. |
| 2017/0116560 A1 | 4/2017 | Wickstrom et al. |
| 2017/0243056 A1 | 8/2017 | Cheng et al. |
| 2018/0165937 A1 | 6/2018 | Devdas et al. |
| 2018/0369039 A1 | 12/2018 | Bhimavarapu et al. |
| 2019/0043337 A1 | 2/2019 | Liu et al. |
| 2019/0146550 A1 | 5/2019 | Berardinelli |
| 2020/0201260 A1 | 6/2020 | Rodriguez et al. |
| 2021/0289319 A1 | 9/2021 | Antony et al. |
| 2022/0189641 A1 | 6/2022 | Staples |
| 2022/0327360 A1 | 10/2022 | Merlin et al. |
| 2022/0328180 A1 | 10/2022 | Chelles et al. |
| 2023/0350004 A1 | 11/2023 | Cnaan-On et al. |
| 2024/0046768 A1 | 2/2024 | Nagy et al. |
| 2024/0404391 A1 | 12/2024 | Nagy et al. |

FOREIGN PATENT DOCUMENTS

| | | |
|---|---|---|
| WO | WO02/082348 A2 | 10/2002 |
| WO | WO2016/102506 A1 | 6/2016 |
| WO | WO2023/076950 A1 | 5/2023 |

OTHER PUBLICATIONS

Contacts Like Listview: Contacts like listview—stack overflow; 1 page; retrieved from the internet (http://stackoverflow.com/questions/5017080/contacts-like-listview) on Feb. 16, 2011.

invisalertsolutions.com; 15-minute checks psychiatry inpatient setting; Feb. 16, 2018; 2 pages retrieved from the internet (https://www.invisalertsolutions.com/>(year:2018); on Aug. 18, 2020.

Google Drive Blog; Rapid wireframe sketching in google docs; 2pages; retrived from the internet (https://drive.googleblog.com/2010/05/rapid-wireframe-sketching-in-google-docs.htm) on May 2010.

JAVA; How to add my app icon in contact list of users' android phone—stack overflow; 1 pages retrieved from the internet (https:stackoverflow.com/questions/25029855/how-to-add-my-app-icon-in-contact-list-of-users-android-phone) on Aug. 18, 2020.

Mcnickle; 7 E-Health tools to get patients engaged; 5 pages; retrieved from the internet (http://www.informationweek.com/healthcare/patient-tools/7-e-health-tools-to-get-patients-engaged/d/d-id/1106716) on Oct. 8, 2012.

Pandey; [How-to] Backup your phone contacts to google; 1 page (Screenshot); retrieved from the interent (http://www.youtube.com/watch?v=vZwvc-7CCf4) on Nov. 15, 2012.

Sain Lukes College On Google Play Reviews; Similar play app stats; 1 page; retrived from the internet (https://www.similarplay.com/dublabs/saint_lukes_college/apps/com.dud.app.saintlukes) on Aug. 18, 2020.

Vladleevideo; Quick Contacts for Android, 2 pages (Screenshot); retrieved from the internet (https://www.youtube.com/watch?v=iRn97Neh-cY) on Apr. 18, 2017.

Winarno; How to backup contacts on samsung S4; 1 page (Screenshot); retrieved from the internet (https://www.youtube.com/watch?v=_MN9RbuV9Vc>); on Jul. 7, 2014.

Marcolongo et al.; U.S. Appl. No. 29/550,879, entitled "Graphical user interface for display screen or portion thereof,", filed Jan. 7, 2016.

Albert et al.; U.S. Appl. No. 18/686,348 entitled "Tamper-resistant wearable band,", filed Feb. 23, 2024.

Nagy; U.S. Appl. No. 18/705,441 entitled "Method and apparatus for preventing elopement,", filed Apr. 26, 2024.

(56) References Cited

OTHER PUBLICATIONS

Nagy; U.S. Appl. No. 18/826,171 entitled "Patient safety monitoring method and apparatus,", filed Sep. 5, 2024.

* cited by examiner

SECURE MOBILE DEVICE MANAGEMENT

CLAIM OF PRIORITY

This patent application claims priority to U.S. Provisional Patent Application No. 63/713,045, titled "SECURE MOBILE DEVICE MANAGEMENT," filed on Oct. 28, 2024, and herein incorporated by reference in its entirety.

INCORPORATION BY REFERENCE

All publications and patent applications mentioned in this specification are herein incorporated by reference in their entirety to the same extent as if each individual publication or patent application was specifically and individually indicated to be incorporated by reference.

FIELD

Described herein are apparatuses (e.g., devices, systems, etc.) that may be used to remotely manage operations of a mobile computing device, particularly in healthcare settings.

BACKGROUND

Mobile devices used in healthcare settings should be highly secured to prevent unauthorized access to patient health information (PHI). Unauthorized access to PHI can be very expensive to the responsible party—such as, a hospital or a vendor providing services to the hospital or patients. Conventionally, PHI is protected by the use of restrictive controls on mobile devices. For example, a Mobile Device Manager (MDM) is a software application that allows an organization to put restrictive policies in place so that the mobile device can't be misused for unauthorized access to PHI. MDM's are typically used with mobile devices that run one or more applications from an Application Store such as the Apple or Google Stores which distribute applications based on iOS or Android operating systems respectively.

Provisioning of an MDM may be complicated due to connectivity or other issues. Successful provisioning can be difficult within one facility, let alone in an enterprise environment that includes many diverse networks. In addition, conventional off-the-shelf MDM systems can typically only manage systems based on iOS or Android operating systems. Unfortunately, iOS and Android operating systems require a very large memory size to store applications and relatively robust processors to run them efficiently. These factors greatly increase the cost of the hardware that otherwise would be needed to support an application if written in firmware language like C. In addition, large memories and robust processors can adversely affect battery life of these mobile devices.

SUMMARY OF THE DISCLOSURE

Described herein are apparatuses (e.g., systems and devices, including hardware, software and/or firmware), and methods to manage mobile devices. More particularly, the apparatuses and methods described herein describe how a secure computing session (also called a secure session) with a mobile computing device is established and terminated. Sensitive data can be transiently transferred to the mobile computing device (and/or collected by the mobile computing device) and used during the secure session. As the secure session ends, the sensitive data is deleted from the mobile device.

In some examples, access to a secure session may be controlled by network and/or system administrators. These administrators can specify particular users that can access a secure session after they are authenticated. Authentication may be through a user identification (user ID) and password.

For example, described herein are methods for securely managing operations of a mobile computing device, and apparatuses configured to perform these methods. For example, a method may include: receiving or accessing, by a remote server (e.g., a "processing device"), security data parameters (e.g., a security file) from a network administrator, wherein the security data parameters comprises encryption, network connection, and a maximum session time; receiving or accessing, by the remote server, session configuration data (e.g., a session file) from a supervisor, wherein the session configuration data comprises session parameters comprising session length, wherein the session length is less than the maximum session time; receiving, by the remote server, authentication data comprising user credentials (e.g., username and password) and a device identifier of the mobile computing device from a user operating a local computing device; authenticating, by the remote server, the user credentials (e.g., by verifying that the user credentials match credentials user credentials accessed by the remote server); initiating a secure session for the mobile computing device by transmitting, from the remote server, the security data parameters, a session configuration data, and the authentication data session data to the mobile computing device; operating the mobile computing device within the security data parameters and session configuration data for a session period until an end of the secure session, wherein the end of the secure session is triggered manually by the user or automatically when the session period reaches the session length; and automatically deleting session data from the mobile computing device after the secure session period is completed.

A network administrator may be an information security officer (ISO). The local computing device may comprise a desktop computer, laptop computer, pad, smartphone, etc. and is typically separate from the one or more mobile computing devices, which may be advantageous for security. In general, the secure session may comprise a time-limited two-way connection between two or more devices.

Any of these method (or apparatuses configured to perform them) may include automatically deleting session data from the mobile computing device when the mobile computing device leaves a designated network that is designated by the network connection. For example, after the mobile computing device leaves the designated network for more than a threshold period of time (e.g., 0.1 seconds, 0.5 seconds, 1 second, 2 seconds, 5 seconds, 10 seconds, 15 seconds, 1 minute, etc. or more).

Any of these methods or apparatuses may include selecting, by the user, a mobile computing device. The mobile computing device may be scanned, manually entered, selected from a menu or list, etc.

In general, initiating the secure session may include transmitting, from the processing device, the session data associated with the user to the mobile computing device. The session data may comprise patient health information. The session data may comprise one or more of: security profile information, encryption algorithms, encryption keys, accessible data types, communication networks, a maximum session duration for use during the secure session, or a combination thereof. The session data may include session profile information comprising a user's maximum session duration and user credentials.

The remote server, which may also be referred to herein as a processing device) may include a network-connected computing device. The remote server may be a cloud-based server. As mentioned, the local computing device may be a desktop computer. The user credentials may include a username and a password.

Any of these methods and apparatuses may include transmitting the session configuration data to the remote server.

Any of these methods and apparatuses may include triggering the end of the secure session, e.g., when the network connection is unresponsive, when the session period reaches the session length (manually or automatically), etc. Any of these apparatuses and methods may include emitting (e.g., transmitting, projecting, etc.) an alert after the end of the secure session is triggered. The alert may be emitted to the user, e.g., from the mobile computing device and/or local computing device, etc. Any appropriate alert may be used, including but not limited to a tone, text (alphanumeric), light, etc.

In any of these methods and apparatuses, the secure session may comprise a time-limited two-way connection between two or more devices; one or more of these devices may be a mobile computing device.

For example, a method for securely managing operations of a mobile computing device may include: receiving or accessing, by a remote server, security data parameters from a network administrator, wherein the security data parameters comprises encryption, network connection, and a maximum session time; receiving or accessing, by the remote server, session configuration data from a supervisor, wherein the session configuration data comprises session parameters comprising session length, wherein the session length is less than the maximum session time; receiving, by the remote server, authentication data comprising user credentials including a username and a password, and a device identifier of the mobile computing device from a user operating a local computing device; authenticating, by the remote server, the user credentials; initiating a secure session for the mobile computing device by transmitting, from the remote server, the security data parameters, a session configuration data, and the authentication data session data to the mobile computing device; operating the mobile computing device within the security data parameters and session configuration data for a session period until an end of the secure session, wherein the end of the secure session is triggered manually by the user or automatically when the session period reaches the session length; and automatically deleting session data from the mobile computing device after the secure session period is completed and/or when the mobile computing device leaves a designated network that is designated by the network connection for longer than a threshold period.

Also described herein are systems configured to perform any of these methods. These systems may include one or more mobile computing devices in addition to software and/or firmware for performing the methods described herein. In some cases these methods may be performed in part at the remote server and/or in the local one or more mobile computing devices. In some cases the system may include an agent (e.g., software) in the local computing device.

For example, a system may include: a mobile computing device; and a first non-transitory, computer-readable storage media having executable instructions that, when executed by one or more processors, cause the one or more processors to perform a method, the method comprising: receiving or accessing, by a remote server, security data parameters from a network administrator, wherein the security data parameters comprises encryption, network connection, and a maximum session time; receiving or accessing, by the remote server, session configuration data from a supervisor, wherein the session configuration data comprises session parameters comprising session length, wherein the session length is less than the maximum session time; receiving, by the remote server, authentication data comprising user credentials and a device identifier for the mobile computing device from a user operating a local computing device; authenticating, by the remote server, the user credentials; and initiating a secure session for the mobile computing device by transmitting, from the remote server, the security data parameters, a session configuration data, and the authentication data session data to the mobile computing device; wherein the mobile computing device is configured to operate within the security data parameters and session configuration data for a session period until an end of the secure session, wherein the end of the secure session is triggered manually by the user or automatically when the session period reaches the session length, and further wherein the mobile computing device is configured to automatically delete session data from the mobile computing device after the secure session period is completed.

Any of these systems may include a plurality of mobile computing devices including the mobile computing device. The one or more processors may be further configured to automatically delete session data from the mobile computing device when the mobile computing device leaves a designated network that is designated by the network connection. Initiating the secure session may include transmitting, from the processing device, the session data associated with the user to the mobile computing device. The session data may comprise patient health information. The session data may comprise one or more of: security profile information, encryption algorithms, encryption keys, accessible data types, communication networks, a maximum session duration for use during the secure session, or a combination thereof. The session data may include session profile information comprising a user's maximum session duration and user credentials. The remote server may include a network-connected computing device. The remote server may be a cloud-based server. The local computing device may comprise a desktop computer. The one or more processors may be configured to transmit the session configuration data to the remote server. The one or more processors may be further configured to trigger the end of the secure session when the network connection is unresponsive. The one or more processors may be further configured to emit an alert after the end of the secure session is triggered.

Any of the methods and apparatuses described herein can include selecting a mobile computing device, providing, by a user, user credentials and a device identifier of the mobile computing device to a processing device, authenticating, by the processing device, the user credentials, where the authentication verifies that the user credentials provided by the user match credentials stored on the processing device, establishing a secure session with the mobile computing device transmitting session data to the mobile computing device; determining an end of the secure session; and automatically deleting the session data the mobile computing device in response to determining the end of the secure session.

In any of the methods described herein, establishing the secure session can include transmitting, from the processing device, the session data associated with the user to the mobile computing device. In some examples, the session data can include security profile information that specifies encryption algorithms, encryption keys, accessible data types, communication networks, a maximum session duration for use during the secure session, or a combination thereof.

In any of the methods described herein, the session data and include session profile information that can include a user's maximum session duration and user credentials. In some examples, any of the methods may describe operating the mobile computing device is in accordance with the session data.

In any of the methods described herein, the processing device can include a network-connected computing device and/or a cloud-based server.

In some examples, the user credentials and the device identifier may be provided by the user through computing device separate from the mobile computing device and the processing device.

In any of the methods described herein, determining the end of the secure session may include determining that the secure session exceeds the maximum session duration. In addition, any of the methods described herein may include transmitting session data to the processing device. In some examples, determination the end of the secure session may include determining that a network connection is unresponsive.

Any of the methods described herein can also include transmitting an alert in response to determining the end of the secure session.

Any of the systems described herein can include a non-transitory, computer-readable storage media having executable instructions that, when executed by one or more processors of a device, cause the one or more processors to perform a method, the method comprising selecting a mobile computing device, providing, by a user, user credentials and a device identifier of the mobile computing device to a processing device, authenticating, by the processing device, the user credentials, wherein the authentication verifies that the user credentials provided by the user match credentials stored on the processing device, establishing a secure session with the mobile computing device, transmitting session data to the mobile computing device, determining an end of the secure session, automatically deleting the session data the mobile computing device.

Any of the methods described herein can include determining system-wide security parameters for a secure communication session, determining user specific security parameters for the secure communication session, authenticating a user request for the secure communication session, and establishing the secure communication session based at least in part on the system-wide security parameters and the user-specific security parameters.

Any of the systems described herein can include a non-transitory, computer-readable storage media having executable instructions that, when executed by one or more processors of a device, cause the one or more processors to perform a method, the method comprising determining system-wide security parameters for a secure communication session, determining user specific security parameters for the secure communication session, authenticating a user request for the secure communication session, and establishing the secure communication session based at least in part on the system-wide security parameters and the user-specific security parameters.

All of the methods and apparatuses described herein, in any combination, are herein contemplated and can be used to achieve the benefits as described herein.

BRIEF DESCRIPTION OF THE DRAWINGS

A better understanding of the features and advantages of the methods and apparatuses described herein will be obtained by reference to the following detailed description that sets forth illustrative embodiments, and the accompanying drawings of which.

DETAILED DESCRIPTION

In general, secure mobile device management may allow a secure session to be established with any feasible mobile device. Within a secure session, the mobile device can receive and use private data, including patient health information. After a period of time, or upon the detection of a loss of network connectivity, private data is removed from the mobile device. In some examples, all data is deleted or removed from the mobile device.

Access to a secure session is based on permissions and credentials provided by administrative personnel. Furthermore, a user is not allowed to begin a secure session until his or her credentials are verified.

The present disclosure is related to systems, methods, computing device readable media, and devices that solve technical problems related to mobile device management including, in particular, configuring a system to establish a secure session with a mobile device. In some examples, particular communication networks are specified for use with a secure session. In addition, types of encryption may be set forth for use with a secure session. In some examples, network administrative personnel may determine user identifiers and associated passwords for authorized users.

In some examples, a mobile device can be configured for a secure session. Configuration can include downloading or receiving patient health information. In some other examples, a temporary operating system can be downloaded, installed, and executed on the mobile device. Upon termination of a secure session, patient health information is deleted from the mobile device. In some examples, the entire memory of the mobile device can be erased (wiped) upon termination of the secure session.

Figure 1:
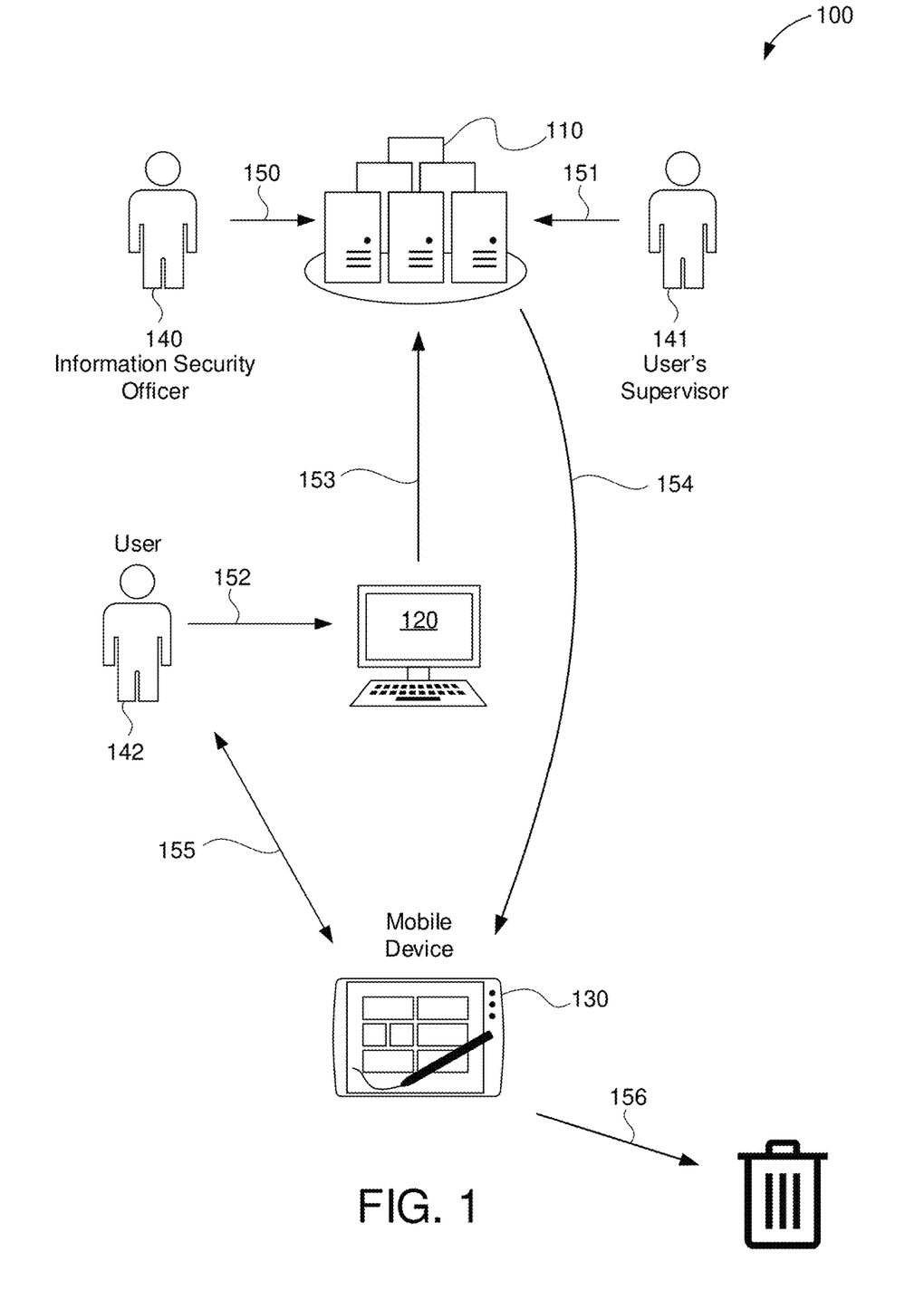
FIG. 1 is simplified diagram of an example of a mobile computing device management system.

FIG. 1 is simplified diagram of a mobile device management system 100. The system 100 can include a server 110, a terminal 120, and a mobile device 130. The system 100 may be used to manage a plurality of mobile devices (sometimes referred to as mobile computing devices), although only a single mobile device 130 is shown here to simplify explanation. The server 110 can include one or more separate and discrete processors, servers, computers, processing devices, or the like. In some examples, the server 110 can be implemented as one or more servers located in a data center (e.g., a cloud-based server) or a number of different data centers where connectivity between the servers is provided through a communications network, such as the Internet.

The terminal 120 may be implemented with any feasible device such as, but not limited to a desktop computer, laptop computer, tablet computer, or any other device that can receive user input and can communicate to the server 110. In some examples, the terminal 120 can communicate to the server 110 through any feasible communication network, including the Internet.

The mobile device 130 can be any feasible mobile computing device including commercially available tablet computing devices running any operating system including, but not limited to Apple mobile operating systems (iOS), Android operating systems, or any proprietary operating system.

The system 100 receives inputs and interactions from an Information Security Officer (ISO) 140, a supervisor 141, and a user 142. Although described separately, actions from the ISO 140 and the supervisor 141 may be performed by the same entity or person. However, in most cases, the user 142 is separate and unique from the ISO 140 and the supervisor 141.

In general, first the ISO 140 defines, sets out or provides secure session parameters (operation 150) through the server 110. A secure session can refer to a secure communication session applied to communications to and from a particular device, such as the mobile device 130. These secure session parameters are sometimes referred to as a security profile. The security profile can include parameters the define basic operations of a secure session. Next, the supervisor 141 defines the user session information (operation 151) for the user 142 through the server 110. The user session information is sometimes referred to as a session profile. The session profile can include parameters the device or refine secure session operations that are associated with a particular user. Provisioning the secure session parameters (operation 150) and defining the available secure sessions (operation 151) can occur prior to use of the mobile device 130 by the user 142. In some examples, the secure session parameters from operation 150 and the user session information from operation 151 define the operating parameters of the secure session available for the user 142.

Next, the user 142 interacts with the system 100. The user 142 selects a mobile device 130 and requests that a secure session be established with the mobile device 130 (operation 152) by supplying user credentials (user ID and password, for example) to the server 110 through the terminal 120. The terminal 120 relays the user credentials to the server 110 (operation 153). The server 110 can validate the user credentials and then begin a secure session with the mobile device 130 (operation 154). In some examples, as a secure session begins, patient health information can be transferred to the mobile device 130. During the secure session, the user 142 can interact with the mobile device 130 (operation 155) and the patient health information. When the secure session ends, sensitive patient health information is removed from the mobile device 130 (operation 156). The operations described with respect to FIG. 1 are described in more detail in FIGS. 2-6.

Figure 2:
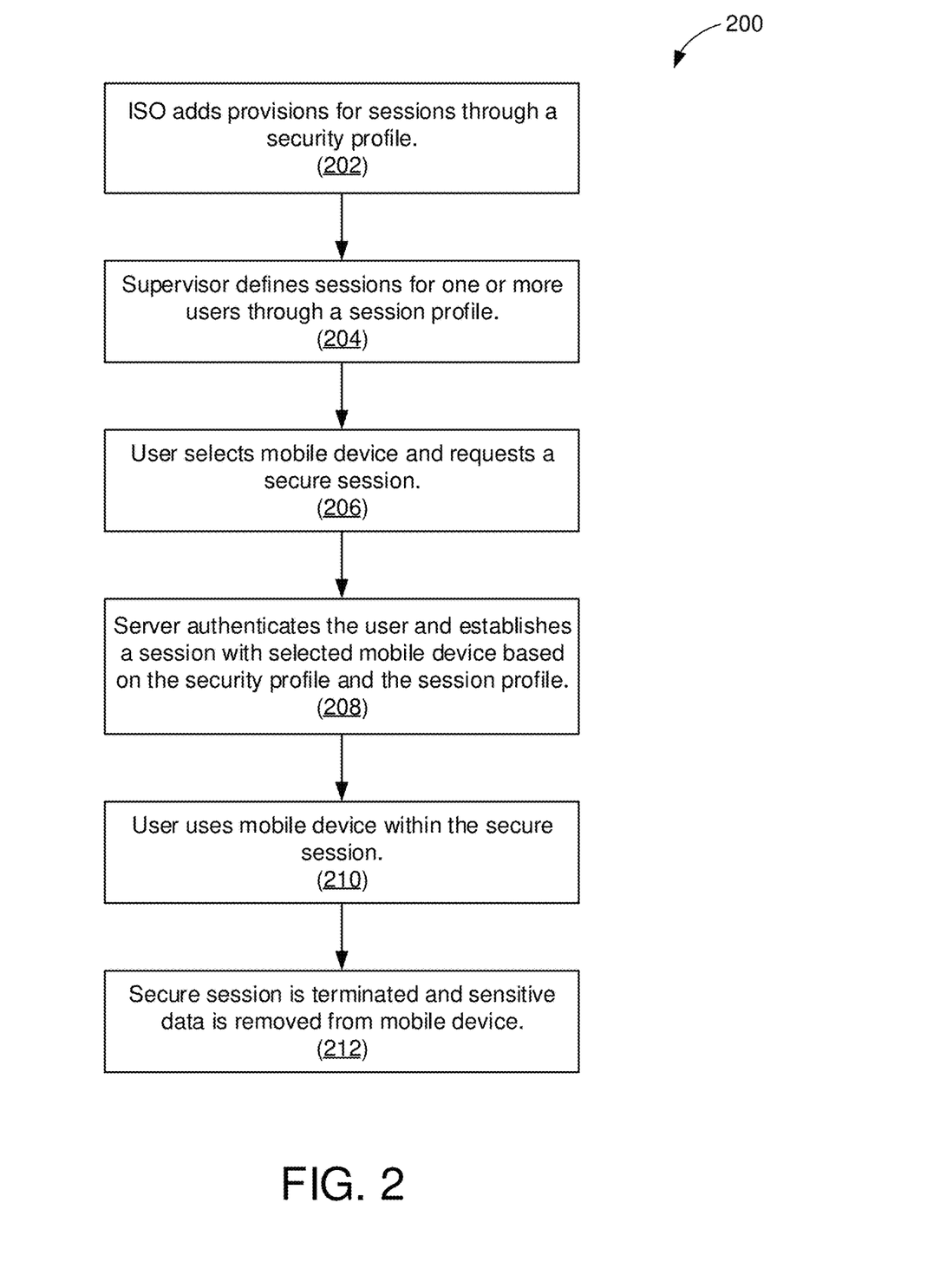
FIG. 2 is a flowchart showing an example method for establishing a secure session.

FIG. 2 is a flowchart showing an example method 200 for establishing a secure session (sometimes called a secure computing session) with a mobile device. Some examples may perform the operations described herein with additional operations, fewer operations, operations in a different order, operations in parallel, and some operations differently. The method 200 is described below with respect to the system 100 of FIG. 1, however, the method 200 may be performed by any other suitable system, device or apparatus.

The method 200 begins in block 202 as the ISO adds parameters for one or more secure sessions through a security profile. A security profile can include one or more files that sets forth basic security configurations and/or parameters for any user that wishes to operate with a secure session. Although described herein as being performed by the ISO, the operations of block 202 can be performed by any feasible person, persons, or groups of people that may be responsible for security aspects and/or administration of the system 100. For example, the security profile can determine the basic system-wide security configurations and/or parameters for the system 100. In some examples, the operations of block 202 may correspond to the operation 150 of FIG. 1. Operations of block 202 are described in more detail below with respect to FIG. 3.

Next, in block 204 a supervisor adds parameters for secure sessions for one or more users through a session profile. The session profile can set forth more restrictive secure session parameters based on the general session parameters in the security profile. In some examples, the session profile can define user-specific security parameters for a secure session. Although described herein as being performed by the supervisor, the operations of block 202 can be performed by any feasible person, persons, or groups of people that may be responsible for security aspects and/or administration of the system 100. In some examples, the operations of block 204 may correspond to those of operation 151 of FIG. 1. The operations of block 204 are described in more detail below with respect to FIG. 3.

Next, in block 206 the user selects a mobile device and requests a secure session. The mobile device can host one or more programs or applications that can be executed to perform or collect patient healthcare assessments or tasks. Requesting a secure session typically includes a verification or authentication of the user's credentials. For example, the user 142 can enter an appropriate user identification (user ID) and password at the terminal 120. In some examples, the terminal 120 is separate and distinct from the server 110 and the mobile device 130. In addition, a request for a secure session includes a device identifier that described the selected mobile device. In some examples, the operations of block 206 may correspond those of operation 152. The operations of block 206 are described in more detail below with respect to FIG. 4.

Next, in block 208, the server 110 authenticates the user and establishes a secure session with the selected mobile device based on the security profile and the session profile. For example, the terminal 120 can send the user ID and password to the server 110 for verification or authentication. If the server 110 confirms that the user ID and the password are correct (match a known user ID and password), then the server 110 can begin a secure session with the mobile device 130. The secure session can be structured in accordance with parameters stored within the security profile and the session profile. In some examples, when a secure session is established, session data may be transmitted to the mobile device 130. For example, patient health information, security profile data, and/or session profile data can be transmitted to the mobile device 130. In some examples, the operations of block 208 may correspond to those of operations 153 and 154. The operations of block 208 are described in more detail below with respect to FIG. 5.

Next, in block 210 the user uses the mobile device within the established secure session. In some examples, the secure session is established in accordance with the security profile of block 202 and the session profile of block 204. In some examples, the operations of block 210 may correspond to those of operation 155. Next, in block 212 the secure session is terminated and session data, including patient health information, is automatically removed from the mobile device 130. That is, no user interaction is required to remove session data from the mobile device 130. In some examples, the operations of block 212 may correspond to those of operations 156. The operations of block 210 are described in more detail below with respect to FIG. 6.

Figure 3:
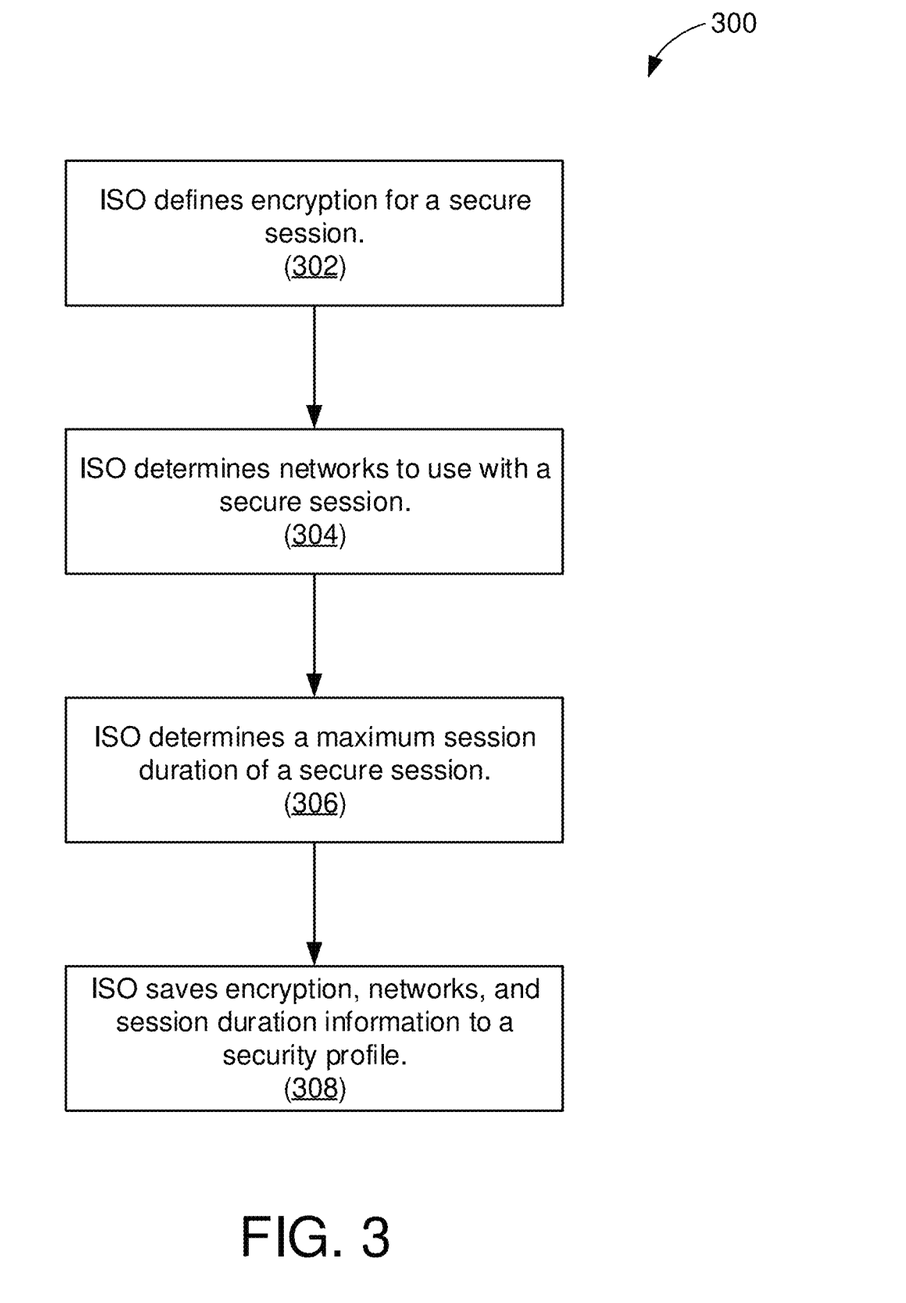
FIG. 3 is a flowchart showing an example method for creating a security profile.

FIG. 3 is a flowchart showing an example method 300 for creating a security profile. The method 300 begins in block 302 as the ISO defines encryption schemes or algorithms that can be used during a secure session. The encryption schemes or algorithms can be any feasible encryption method including any symmetric and/or asymmetric encryption algorithms. In some cases, the encryption used during a secure session may be in addition to any encryption or encoding that may be used within a communication channel used during the secure session. Therefore, in some cases communication data may be encrypted twice.

Next, in block 304, the ISO determines networks that can be used during a secure session. For example, the ISO may select particular networks that are known to be secure and free from attacks, spoofing, man-in-the-middle attacks, or the like. In this manner, the ISO can restrict secure sessions from being carried out over any undesirable, unknown, or untrusted networks. The networks may be specified by a network service set identifier (SSID), internet protocol (IP) address of known gateways or access points, or the like.

Next, in block 306, the ISO determines a maximum session duration for a secure session. The maximum session duration can describe a session time length that cannot be exceeded. If a secure session runs longer than the maximum session duration, then the secure session can be terminated.

Next, in block 308 the encryption information, network information, and session duration information are saved to a security profile. In some examples, the security profile is saved within the server 110 of FIG. 1. In general, the security profile describes secure session parameters that are applied to all secure sessions. Thus, the security profile describes default or minimum settings that are used to ensure privacy and protect sensitive data during a secure session. In some examples, the security profile can include encryption keys associated with the ISO selected encryption.

Figure 4:
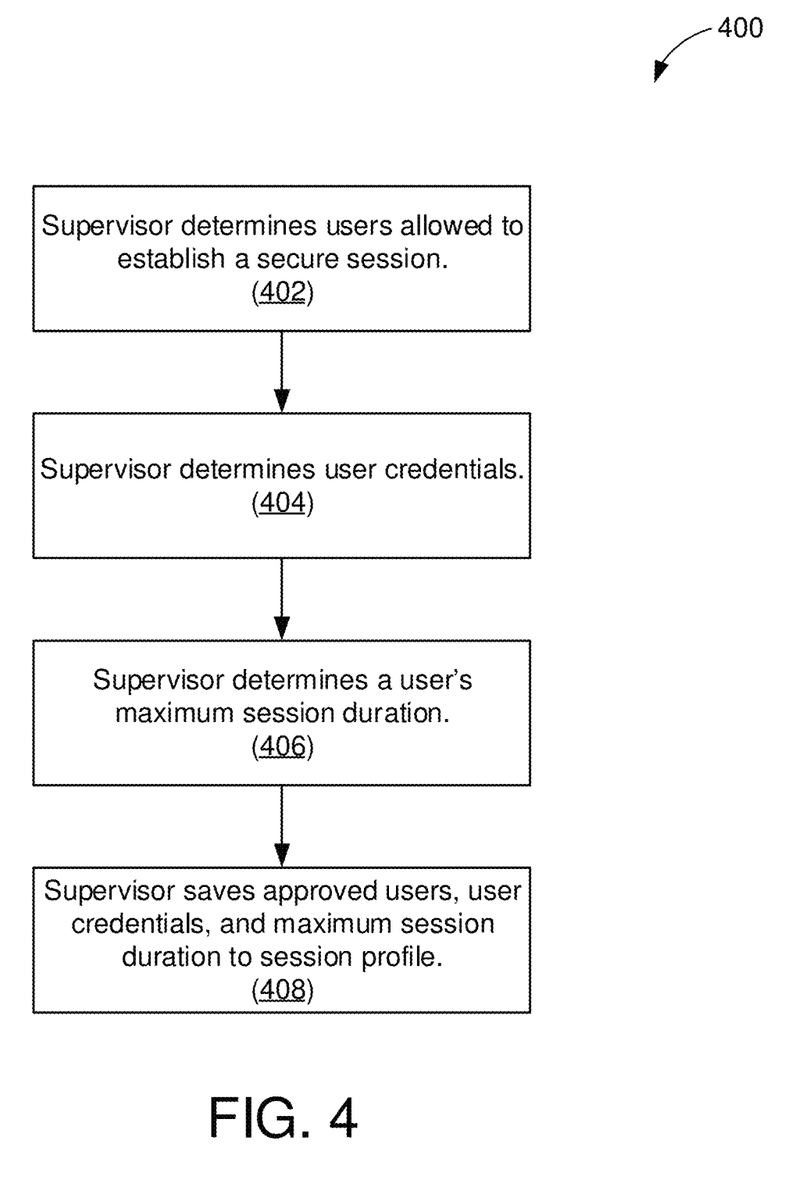
FIG. 4 is a flowchart showing an example method for creating a session profile.

FIG. 4 is a flowchart showing an example method 400 for creating a session profile. The method 400 begins in block 402 as a supervisor determines which users are allowed to establish a secure session. In this way, the supervisor can limit access to sensitive patient health data to only those qualified and determined to have access to this data.

Next, in block 404 the supervisor determines user credentials. Now that the users have been determined (in block 402), the user's credentials can be determined. In some examples, the users' credentials can include a user ID and an associated password. In some cases, the user ID and password are determined by the supervisor. In some other examples the user ID and password can be determined jointly with the user, or solely by the user. The user ID and password is used to authenticate (validate) a user prior to an establishment of a secure session. In some examples, the supervisor may also determine a type and extent of data any particular user is permitted to access. This accessible data type can be associated with the user's credentials.

Next, in block 406 the supervisor determines a user's maximum secure session duration time. Although a system-wide maximum secure session duration is defined in the security profile described in FIG. 3, the supervisor may shorten the maximum secure session time that is associated with a particular user. For example, the supervisor may specify a time period that is shorter than the maximum secure session time of the security profile. In most implementations, the times specified in block 406 cannot exceed the maximum secure session duration times specified in the security profile; the session times can only be shorter. Furthermore, different users may be allowed different maximum secure session times.

Next in block 408, the approved users, user IDs, password, and maximum secure session times are stored or saved in a session profile. The session profile may be saved in the server 110. Although the method 300 of FIG. 3 and the method 400 are described as being performed by different entities (a ISO for the method of FIG. 3 and a supervisor for the method of FIG. 4), the same logical entity (person, group of people, groups of people) may perform both the method 300 and the method 400.

Figure 5:
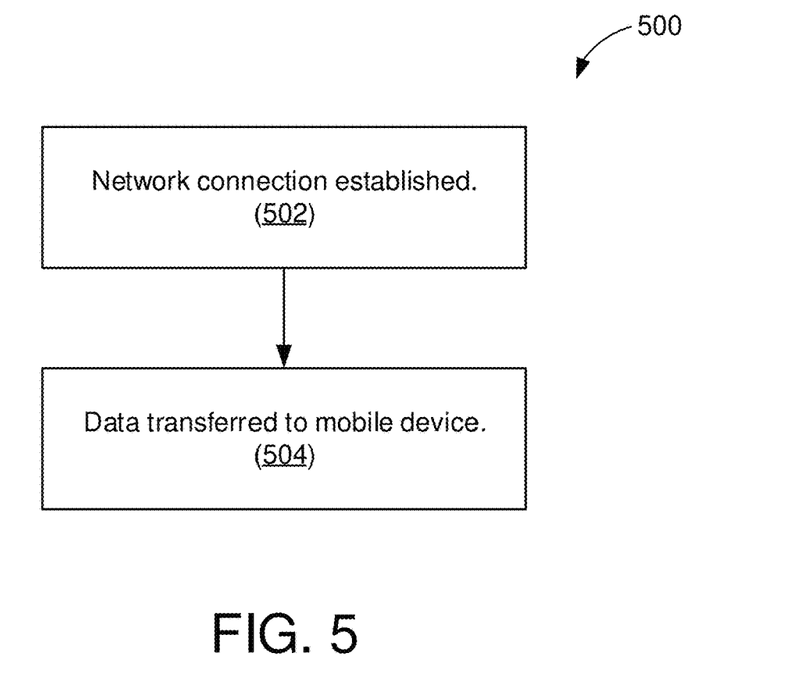
FIG. 5 is a flowchart showing an example method for establishing a secure session.

FIG. 5 is a flowchart showing an example method 500 for establishing a secure session. A secure session can refer to a compute environment within which one or more programs and/or applications can be executed. Moreover, any data that exists within the secure session compute environment is protected from unauthorized access. Data protection is afforded through controlled access (authentication of user ID and password) as well as data removal when the secure session is complete.

In some examples, the secure session compute environment can be within an operating system such as, but not limited to, iOS provided by Apple™, Linux, Windows provided by Microsoft Corporation, and the Android operating systems. In some other examples, the secure session compute environment can be within a proprietary operating environment. Some proprietary operating environments can be "lightweight" requiring minimal amounts of memory and processor power, particular in comparison with more generic implementations supporting Window, iOS, or the like.

The method 500 begins in block 502 as a network connection is established between the selected mobile device (selected in block 206 of FIG. 2) and the server 110. The network connection may be determined, at least in part, by the session profile stored in the server 110. In this manner, the networks which are used for the secure session are controlled.

Next, in block 504 data is transferred to the mobile device. The transferred data can include confidential patient health information (PHI) (patient statistics, diagnoses, insurance information, and the like). In some examples, the transferred data can also include a proprietary operating system.

The transferred data can also include the maximum secure session time. In this manner, the mobile device can begin a local timer to monitor the secure session time. In some examples, while running in the secure session, data may be transferred from the mobile device back to the server 110. In this manner, any patient data that is collected by the user using the mobile device is securely transferred to the server 110 using encryption and specified communication networks.

Figure 6:
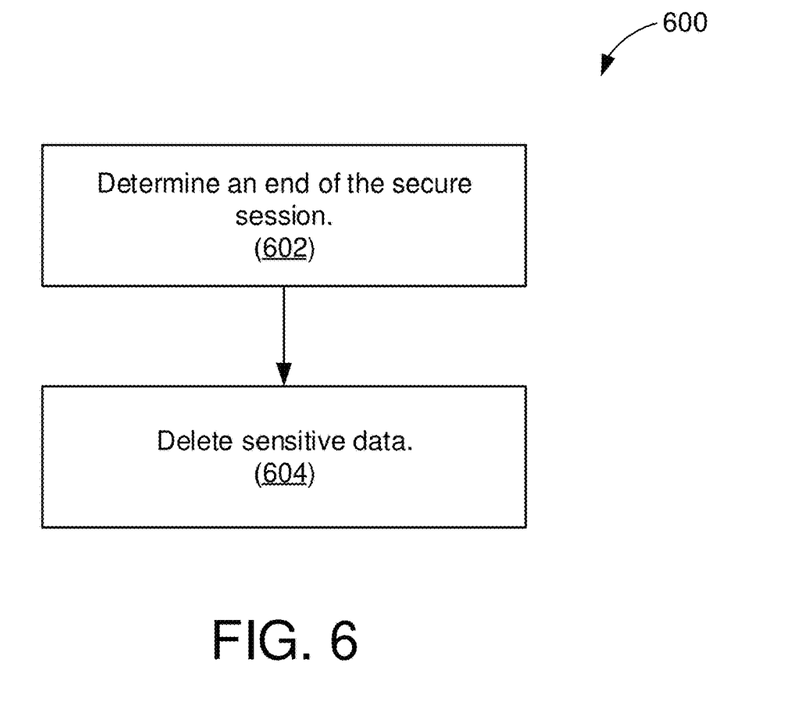
FIG. 6 a flowchart showing an example method for ending a secure session.

FIG. 6 a flowchart showing an example method 600 for ending a secure session. The method 600 begins in block 602 as the end of the secure session is determined. In some examples, the end of the secure session occurs when the secure session time exceeds a maximum secure session duration as specified herein. In another example, the end of the secure session can occur when the network connection is lost. For example, the mobile device may be moved out of the range of the approved communication network (the network is unresponsive). In another example, one or more communication components that provide the communication network can go out of service. In some examples, an alert can be generated and/or when the secure session time exceeds the maximum secure session duration or when the network is unresponsive. For example, an alert can be transmitted to the user, the supervisor, and/or the ISO when an end of the secure session is determined.

Next, in block 604, sensitive data is deleted from the mobile device. In some examples, sensitive patient health information is deleted and/or erased from the mobile device. In some cases, patient health information is transmitted back to the server 110 before data is erased. This is particularly advantageous when the communication network is still functioning.

In some other examples, all data (including operating system data) may be deleted from the mobile communication device. This action prevents unauthorized access to not only sensitive patient data but also a sensitive communication network.

Figure 7:
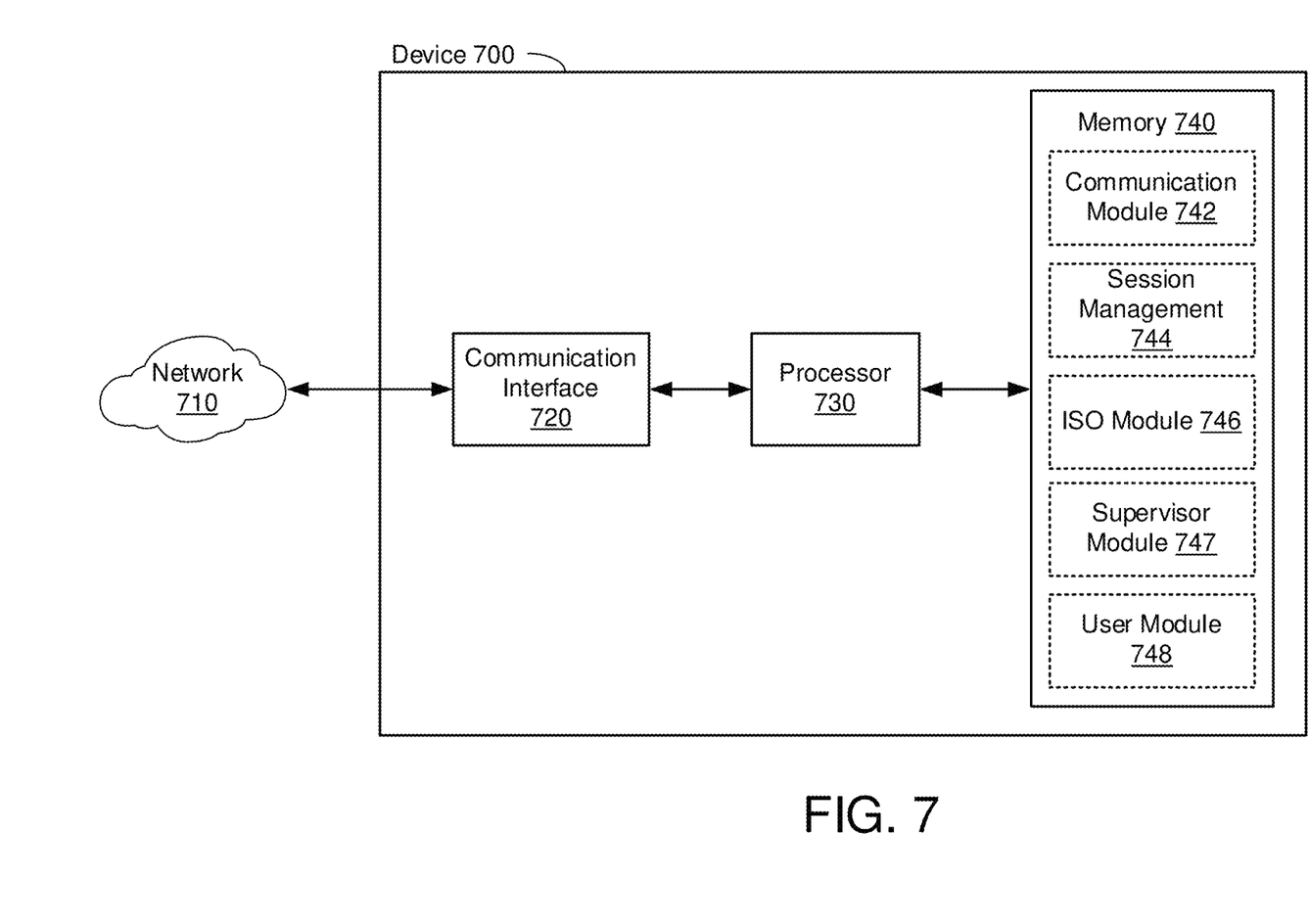
FIG. 7 shows a block diagram of a device that may be one example of the mobile device of FIG. 1.

FIG. 7 shows a block diagram of a device 700 that may be one example of the server 110, the mobile device 130, or the terminal 120 of FIG. 1. The device 700 may include a communication interface 720, a processor 730, and a memory 740.

The communication interface 720, which may be coupled to a network (such as network 710) and to the processor 730, may transmit signals to and receive signals from other wired or wireless devices, including remote (e.g., cloud-based) storage devices, cameras, processors, compute nodes, processing nodes, computers, servers, terminals, mobile devices (e.g., cellular phones, tablet computers and the like) and/or displays. For example, the communication interface 720 may include wired (e.g., serial, ethernet, or the like) and/or wireless (Bluetooth, Wi-Fi, cellular, or the like) transceivers that may communicate with any other feasible device through any feasible network. In some examples, the communication interface 720 may transmit and/or receive patient health information, security profile information, session profile information, user credentials or the like.

The processor 730, which is also coupled to the communication interface 720, and the memory 740, may be any one or more suitable processors capable of executing scripts or instructions of one or more software programs stored in the device 700 (such as within memory 740).

The memory 740 may also include a non-transitory computer-readable storage medium (e.g., one or more nonvolatile memory elements, such as EPROM, EEPROM, Flash memory, a hard drive, etc.) that may store the following software modules: a communication module 742 to communicate through the communication interface 720; a session management module 744 to manage a secure session with the device 700; an ISO module 746 to determine elements of a security profile; a supervisor module 747 to determine elements of session profile; and a user module 748 to authenticate a user's credentials.

Each software module includes program instructions that, when executed by the processor 730, may cause the device 700 to perform the corresponding function(s). Thus, the non-transitory computer-readable storage medium of memory 740 may include instructions for performing all or a portion of the operations described herein.

The processor 730 may execute the communication module 742 to communicate with any other feasible devices through the communication interface 720 and the network 710. In some examples, the network 710 can be any feasible communication network or medium, including the Internet. Execution of the communication module 742 may enable the device 700 to communicate via cellular networks conforming to any of the LTE standards promulgated by the $3^{rd}$ Generation Partnership Project (3GPP) working group, Wi-Fi networks conforming to any of the IEEE 802.11 standards, Bluetooth protocols put forth by the Bluetooth Special Interest Group (SIG), Ethernet protocols, or the like. In some embodiments, execution of the communication module 742 may enable the device 700 to communicate with a server, a terminal or any other feasible device. In some other embodiments, execution of the communication module 742 may implement encryption and/or decryption procedures.

The processor 730 may execute the session management module 744 to manage operation of the device 700. For example, execution of the session management module 744 may cause the processor 730 to monitor communication network status and operation time of a secure session. In some examples, the processor 730 can delete patient health information or any other feasible data based on communication network status and/or secure session operation time.

The processor 730 may execute the ISO module 746 to determine one or more elements of a security profile. For example, execution of the ISO module 746 can define encryption for use with a secure session, determine communication networks to use with a secure session, and/or determine a maximum session duration of a secure session. In some examples, one or more of these elements may be written into a security profile file.

The processor 730 may execute the supervisor module 747 to determine one or more elements of a session profile. For example, execution of the supervisor module 747 can determine users allowed to establish a secure session, determine users' credentials, and determine a users' maximum session duration. In some examples, one or more of these elements may be written into a session profile.

The processor 730 may execute the user module 748 to authenticate the user. For example, execution of the user module 748 can cause the processor 730 to send user supplied credentials to a remote computing device, server, or the like to initiate or establish a secure session. In other examples, execution of the user module 748 can cause the processor 730 to send a user's selection of mobile device as described with respect to FIGS. 1 and 2.

It should be appreciated that all combinations of the foregoing concepts and additional concepts discussed in greater detail below (provided such concepts are not mutually inconsistent) are contemplated as being part of the inventive subject matter disclosed herein and may be used to achieve the benefits described herein.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

Any of the methods (including user interfaces) described herein may be implemented as software, hardware or firmware, and may be described as a non-transitory computer-readable storage medium storing a set of instructions capable of being executed by a processor (e.g., computer, tablet, smartphone, etc.), that when executed by the processor causes the processor to control perform any of the steps, including but not limited to: displaying, communicating with the user, analyzing, modifying parameters (including timing, frequency, intensity, etc.), determining, alerting, or the like. For example, any of the methods described herein may be performed, at least in part, by an apparatus including one or more processors having a memory storing a non-transitory computer-readable storage medium storing a set of instructions for the processes(s) of the method.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

As described herein, the computing devices and systems described and/or illustrated herein broadly represent any type or form of computing device or system capable of executing computer-readable instructions, such as those contained within the modules described herein. In their most basic configuration, these computing device(s) may each comprise at least one memory device and at least one physical processor.

The term "memory" or "memory device," as used herein, generally represents any type or form of volatile or non-volatile storage device or medium capable of storing data and/or computer-readable instructions. In one example, a memory device may store, load, and/or maintain one or more of the modules described herein. Examples of memory devices comprise, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "processor" or "physical processor," as used herein, generally refers to any type or form of hardware-implemented processing unit capable of interpreting and/or executing computer-readable instructions. In one example, a physical processor may access and/or modify one or more modules stored in the above-described memory device. Examples of physical processors comprise, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the method steps described and/or illustrated herein may represent portions of a single application. In addition, in some embodiments one or more of these steps may represent or correspond to one or more software applications or programs that, when executed by a computing device, may cause the computing device to perform one or more tasks, such as the method step.

In addition, one or more of the devices described herein may transform data, physical devices, and/or representations of physical devices from one form to another. Additionally or alternatively, one or more of the modules recited herein may transform a processor, volatile memory, non-volatile memory, and/or any other portion of a physical computing device from one form of computing device to another form of computing device by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media comprise, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

A person of ordinary skill in the art will recognize that any process or method disclosed herein can be modified in many ways. The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed.

The various exemplary methods described and/or illustrated herein may also omit one or more of the steps described or illustrated herein or comprise additional steps in addition to those disclosed. Further, a step of any method as disclosed herein can be combined with any one or more steps of any other method as disclosed herein.

The processor as described herein can be configured to perform one or more steps of any method disclosed herein. Alternatively or in combination, the processor can be configured to combine one or more steps of one or more methods as disclosed herein.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

In general, any of the apparatuses and methods described herein should be understood to be inclusive, but all or a sub-set of the components and/or steps may alternatively be exclusive, and may be expressed as "consisting of" or alternatively "consisting essentially of" the various components, steps, sub-components or sub-steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method for securely managing operations of a mobile computing device, the method comprising:
    receiving or accessing, by a remote server, security data parameters from a network administrator, wherein the security data parameters comprises encryption, network connection, and a maximum session time;
    receiving or accessing, by the remote server, session configuration data from a supervisor, wherein the session configuration data comprises session parameters comprising session length, wherein the session length is less than the maximum session time;
    receiving, by the remote server, authentication data comprising user credentials and a device identifier of the mobile computing device from a user operating a local computing device;
    authenticating, by the remote server, the user credentials;
    initiating a secure session for the mobile computing device by transmitting, from the remote server, the security data parameters, a session configuration data, and the authentication data session data to the mobile computing device;
    operating the mobile computing device within the security data parameters and session configuration data for a session period until an end of the secure session, wherein the end of the secure session is triggered manually by the user or automatically when the session period reaches the session length; and
    automatically deleting session data from the mobile computing device after the secure session period is completed.

2. The method of claim 1, further comprising automatically deleting session data from the mobile computing device when the mobile computing device leaves a designated network that is designated by the network connection.

3. The method of claim 1, further comprising selecting, by the user, a mobile computing device.

4. The method of claim 1, wherein initiating the secure session includes transmitting, from the processing device, the session data associated with the user to the mobile computing device.

5. The method of claim 1, wherein the session data comprises patient health information.

6. The method of claim 1, wherein the session data comprises one or more of: security profile information, encryption algorithms, encryption keys, accessible data types, communication networks, a maximum session duration for use during the secure session, or a combination thereof.

7. The method of claim 1, where in the session data includes session profile information comprising a user's maximum session duration and user credentials.

8. The method of claim 1, wherein the remote server includes a network-connected computing device.

9. The method of claim 1, wherein the remote server is a cloud-based server.

10. The method of claim 1, wherein the local computing device comprises a desktop computer.

11. The method of claim 1, further comprising transmitting the session configuration data to the remote server.

12. The method of claim 1, further comprising triggering the end of the secure session when the network connection is unresponsive.

13. The method of claim 1, further comprising transmitting an alert after the end of the secure session is triggered.

14. The method of claim 1, wherein the secure session comprises a time-limited two-way connection between two or more devices.

15. A method for securely managing operations of a mobile computing device, the method comprising:
receiving or accessing, by a remote server, security data parameters from a network administrator, wherein the security data parameters comprises encryption, network connection, and a maximum session time;
receiving or accessing, by the remote server, session configuration data from a supervisor, wherein the session configuration data comprises session parameters comprising session length, wherein the session length is less than the maximum session time;
receiving, by the remote server, authentication data comprising user credentials including a username and a password, and a device identifier of the mobile computing device from a user operating a local computing device;
authenticating, by the remote server, the user credentials;
initiating a secure session for the mobile computing device by transmitting, from the remote server, the security data parameters, a session configuration data, and the authentication data session data to the mobile computing device;
operating the mobile computing device within the security data parameters and session configuration data for a session period until an end of the secure session, wherein the end of the secure session is triggered manually by the user or automatically when the session period reaches the session length; and
automatically deleting session data from the mobile computing device after the secure session period is completed and/or when the mobile computing device leaves a designated network that is designated by the network connection for longer than a threshold period.

16. A system comprising:
a mobile computing device; and
a first non-transitory, computer-readable storage media having executable instructions that, when executed by one or more processors, cause the one or more processors to perform a method, the method comprising:
receiving or accessing, by a remote server, security data parameters from a network administrator, wherein the security data parameters comprises encryption, network connection, and a maximum session time;
receiving or accessing, by the remote server, session configuration data from a supervisor, wherein the session configuration data comprises session parameters comprising session length, wherein the session length is less than the maximum session time;
receiving, by the remote server, authentication data comprising user credentials and a device identifier for the mobile computing device from a user operating a local computing device;
authenticating, by the remote server, the user credentials; and
initiating a secure session for the mobile computing device by transmitting, from the remote server, the security data parameters, a session configuration data, and the authentication data session data to the mobile computing device;
wherein the mobile computing device is configured to operate within the security data parameters and session configuration data for a session period until an end of the secure session, wherein the end of the secure session is triggered manually by the user or automatically when the session period reaches the session length, and further wherein the mobile computing device is configured to automatically delete session data from the mobile computing device after the secure session period is completed.

17. The system of claim 16, further comprising a plurality of mobile computing devices including the mobile computing device.

18. The system of claim 16, wherein the one or more processors are further configured to automatically delete session data from the mobile computing device when the mobile computing device leaves a designated network that is designated by the network connection.

19. The system of claim 16, wherein initiating the secure session includes transmitting, from the processing device, the session data associated with the user to the mobile computing device.

20. The system of claim 16, wherein the session data comprises patient health information.

21. The system of claim 16, wherein the session data comprises one or more of: security profile information, encryption algorithms, encryption keys, accessible data types, communication networks, a maximum session duration for use during the secure session, or a combination thereof.

22. The system of claim 16, where in the session data includes session profile information comprising a user's maximum session duration and user credentials.

23. The system of claim 16, wherein the remote server includes a network-connected computing device.

24. The system of claim 16, wherein the remote server is a cloud-based server.

25. The system of claim 16, wherein the local computing device comprises a desktop computer.

26. The system of claim 16, wherein the one or more processors are further configured to transmit the session configuration data to the remote server.

27. The system of claim 16, wherein the one or more processors are further configured to trigger the end of the secure session when the network connection is unresponsive.

28. The system of claim 16, wherein the one or more processors are further configured to emit an alert after the end of the secure session is triggered.

* * * * *